United States Patent [19]
Chao

[11] Patent Number: 5,929,964
[45] Date of Patent: *Jul. 27, 1999

[54] AUXILIARY FRAME SECURING MECHANISM

[76] Inventor: David Yinkai Chao, 1120 Green Acre Rd., Towson, Md. 21204

[*] Notice: This patent is subject to a terminal disclaimer.

[21] Appl. No.: 09/006,607

[22] Filed: Jan. 13, 1998

[51] Int. Cl.⁶ ........................................................ G02C 7/08
[52] U.S. Cl. ................................................ 351/47; 351/57
[58] Field of Search .................................. 351/47, 57, 41, 351/44, 158; 2/441, 443

[56] References Cited

U.S. PATENT DOCUMENTS 5,568,207  10/1996  Chao .......................................... 351/47

Primary Examiner—Hung Xuan Dang
Attorney, Agent, or Firm—Charles E. Baxley

[57] ABSTRACT

An eyeglass device includes a primary frame having two studs formed in the sides. The studs each has an opening. An auxiliary frame for disposing in front of the primary frame includes two hooks formed in the sides for engaging with the opening of the stud. A securing mechanism includes a spring-based latch for engaging with the hook and for securing the hook to the stud. A pair of legs are pivotally coupled to the studs. A pair of spring-biased balls may engage with the legs for securing the legs to the studs.

4 Claims, 2 Drawing Sheets

AUXILIARY FRAME SECURING MECHANISM

BACKGROUND OF THE INVENTION

1. Field of the Invention

The present invention relates to a pair of eyeglasses, and more particularly to a pair of eyeglasses having an auxiliary frame for supporting auxiliary lenses.

2. Description of the Prior Art

The closest prior art of which applicant is aware is U.S. Pat. No. 5,568,207 to Chao and includes an auxiliary frame to be secured to the primary frame which should be engaged with magnets for engaging with the magnets that are engaged in the auxiliary frame.

The present invention has arisen to provide a novel configuration for securing the auxiliary frame to the primary frame.

SUMMARY OF THE INVENTION

The primary objective of the present invention is to provide an eyeglass device in which the side studs of the primary frame each includes an opening for engaging with a hook or a magnet of the auxiliary frame for solidly and stably securing the auxiliary frame to the primary frame.

In accordance with one aspect of the invention, there is provided an eyeglass device comprising a primary frame including two sides each having a stud, the studs each including an opening, an auxiliary frame for disposing in front of the primary frame, the auxiliary frame including two sides each having a hook for engaging with the opening of the stud, and means for securing the auxiliary frame to the primary frame.

The securing means includes a spring-biased latch for engaging with the hook and for securing the hook to the stud.

The studs each includes a groove communicating with the opening, a latch slidably engaged in the groove, and means for biasing the latch inward of the opening to engage with the hook and to secure the hook to the stud. The studs each includes an annular flange formed between the opening and the groove for defining a shoulder and for engaging with the latch. The hooks each includes an annular recess for engaging with the latch and for solidly securing the hook to the stud. A pair of legs each includes a first end pivotally coupled to the studs at a pivot shaft, a pair of balls are engaged in the grooves and engaged with the biasing means, for allowing the biasing means to bias the ball to engage with the first end of the leg and for securing the leg to the stud.

The hooks each includes an annular flange for engaging with the stud and for limiting a relative movement of the hook to the stud.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
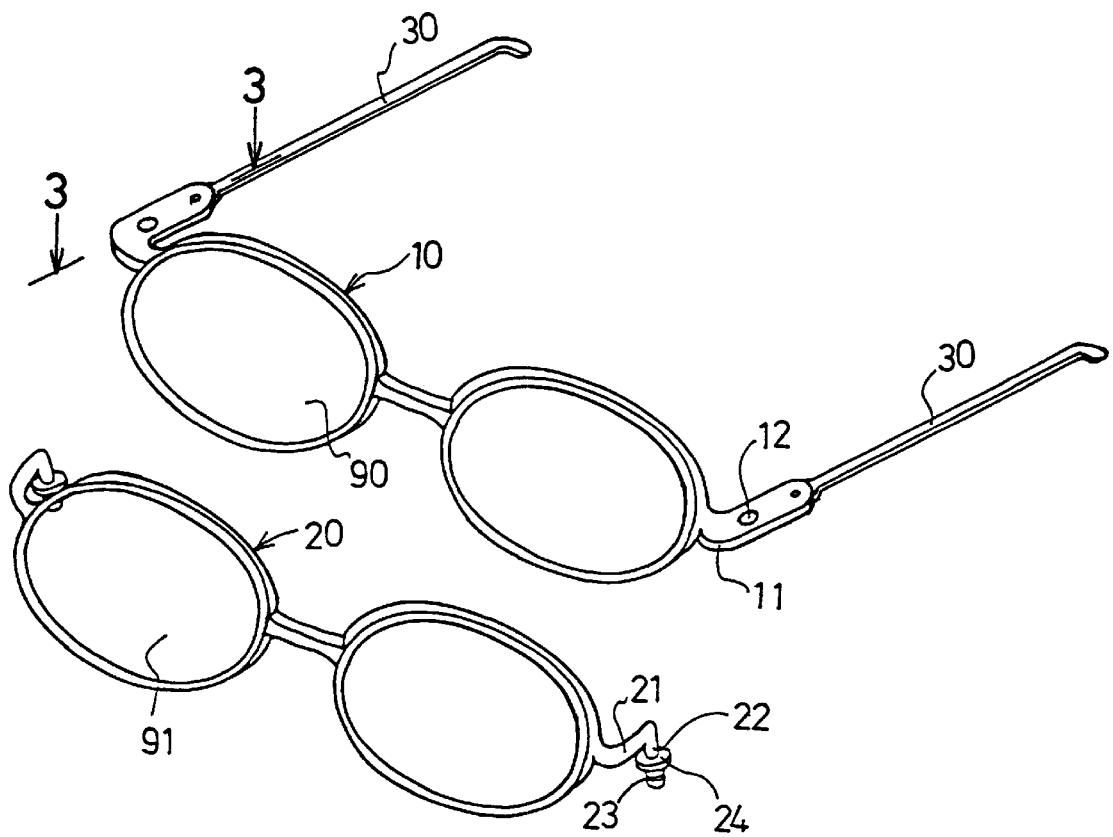
FIG. 1 is an exploded view of an eyeglass device having an auxiliary frame in accordance with the present invention.
Figure 2:
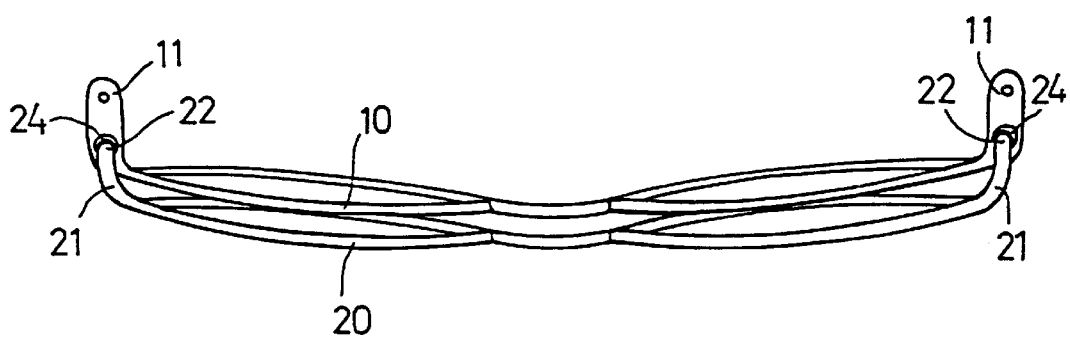
FIG. 2 is a top view illustrating the engagement of the auxiliary frame to the eyeglass device.
Figure 5:
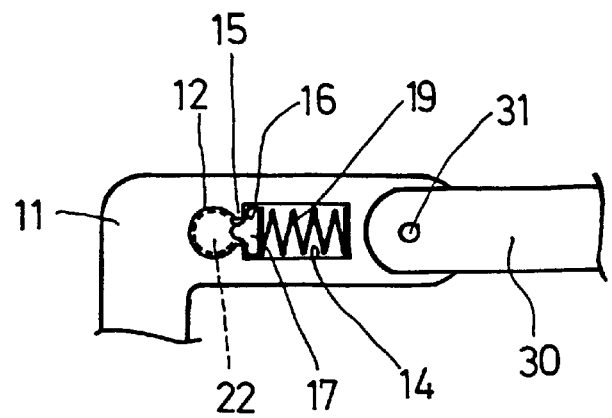
FIG. 5 is a partial cross sectional view similar to FIGS. 3 and 4, illustrating another application of the auxiliary frame securing mechanism.
Figure 4:
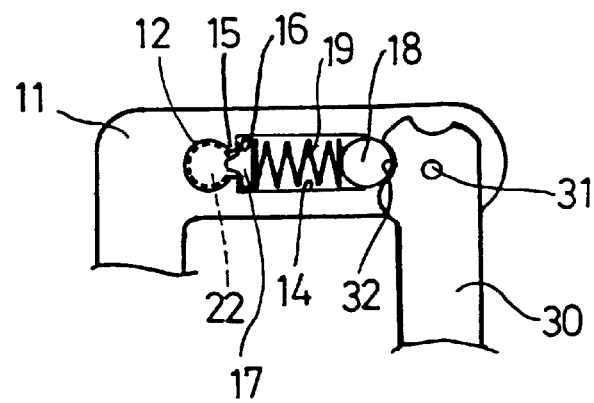
FIG. 4 is a partial cross sectional view similar to FIG. 3, illustrating the operation of the auxiliary frame securing mechanism.
Figure 3:
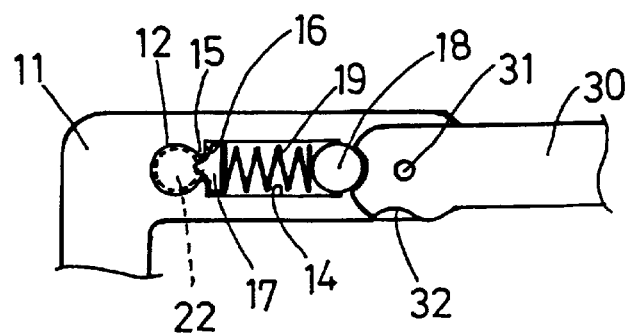
FIG. 3 is a partial cross sectional view taken along lines 3—3 of FIG. 1.

Referring to the drawings, and initially to FIGS. 1–3, an eyeglass device in accordance with the present invention comprises a primary frame 10 for supporting primary lenses 90 and including two studs 11 formed in the side portions. The studs 11 each includes an opening 12 and each includes a groove 14 formed in the stud 11 and communicating with the opening 12. A pair of stops or an annular flange 15 is formed between the opening 12 and the groove 14 for defining a shoulder 16. A latch 17 is engaged in one end of the groove 14 and is partially extendible inward of the opening 12 (FIGS. 3, 4). The shoulder 16 may engage with the latch 17 and may limit the engagement of the latch 17 into the opening 12. A ball 18 is engaged in the other end of the groove 14. A spring 19 is engaged in the groove 14 and engaged between the ball 18 and the latch 17 for biasing the latch 17 inward of the opening 12.

An auxiliary frame 20 for supporting auxiliary lenses 91 and for disposing in front of the primary frame includes two extensions 21 disposed in the side portions and extended rearward for engaging over the studs 11 of the primary frame 10 respectively. The extensions 21 each includes a hook 22 for hooking and engaging into the opening 12 of the stud 11. It is preferable that the hooks 22 each includes an annular recess 23 for engaging with the latch 17 and for solidly securing the hook 22 to the stud 11. It is preferable that the hooks 22 each includes an annular flange 24 extended radially outward for engaging with the stud 11 and for limiting the engagement of the hooks 22 into the openings 12 and for preventing dirt from entering into the opening 12.

A pair of legs 30 each includes one end pivotally coupled to the stud 11 at a pivot shaft 31 and each includes one or more arcuate surfaces 32 for engaging with the ball 18. The spring 19 may bias the ball 18 to engage with the arcuate surfaces 32 for positioning the legs 30 in place (FIGS. 3, 4).

The extension 21 and the hook 22 may also be made of magnetic material, such as metal, for engaging with the stud 11 which is made of magnetic material.

Accordingly, the eyeglass device in accordance with the present invention includes a primary frame having an opening formed in each of the studs for engaging with the hooking member of the auxiliary frame and for solidly and stably securing the auxiliary frame to the primary frame.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An eyeglass device comprising:

a primary frame including two sides each having a stud, said studs each including an opening, an auxiliary frame for disposing in front of said primary frame, said auxiliary frame including two sides each having a hook for engaging with said opening of said stud, said securing means includes a spring-biased latch for engaging with said hook and for securing said hook to said stud, said studs each includes a groove communicating with said opening, a latch slidably engaged in said groove, and means for biasing said latch inward of said opening to engage with said hook and to secure said hook to said stud.

2. The eyeglass device according to claim 1, wherein said studs each includes an annular flange formed between said opening and said groove for defining a shoulder and for engaging with said latch.

3. The eyeglass device according to claim 1, wherein hooks each includes an annular recess for engaging with said latch and for solidly securing said hook to said stud.

4. The eyeglass device according to claim 1 further comprising a pair of legs each including a first end pivotally coupled to said studs at a pivot shaft, a pair of balls engaged in said grooves and engaged with said biasing means, for allowing said biasing means to bias said ball to engage with said first end of said leg and for securing said leg to said stud.

* * * * *